(12) United States Patent
Hasegawa

(10) Patent No.: US 11,937,161 B2
(45) Date of Patent: Mar. 19, 2024

(54) INFORMATION PROCESSING DEVICE, INFORMATION PROCESSING METHOD, AND PROGRAM

(71) Applicant: TOYOTA JIDOSHA KABUSHIKI KAISHA, Toyota (JP)

(72) Inventor: Hideo Hasegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 17/550,657

(22) Filed: Dec. 14, 2021

(65) Prior Publication Data

US 2022/0256325 A1   Aug. 11, 2022

(30) Foreign Application Priority Data

Feb. 10, 2021   (JP) ................ 2021-020141

(51) Int. Cl.
  *H04W 4/90*   (2018.01)
  *B60L 55/00*   (2019.01)
  *G07C 5/00*   (2006.01)

(52) U.S. Cl.
  CPC ........... *H04W 4/90* (2018.02); *B60L 55/00* (2019.02); *G07C 5/008* (2013.01)

(58) Field of Classification Search
  CPC ...................................... H04W 4/90
  USPC ...................................... 455/404.1
  See application file for complete search history.

(56) References Cited

U.S. PATENT DOCUMENTS

| 6,859,695 | B2 * | 2/2005 | Klausner | B60R 16/0232 |
| | | | | 701/33.9 |
| 9,652,964 | B2 * | 5/2017 | Kang | G06Q 10/00 |
| 2012/0016546 | A1 * | 1/2012 | Nilssen | B60L 53/50 |
| | | | | 180/65.265 |
| 2014/0295903 | A1 * | 10/2014 | Hatsutori | H04W 8/085 |
| | | | | 455/521 |
| 2020/0213852 | A1 * | 7/2020 | Obaidi | H04L 9/3239 |
| 2021/0014643 | A1 * | 1/2021 | Kuroda | H04W 4/40 |

FOREIGN PATENT DOCUMENTS

DE   102005002277 A1   10/2006
JP   2016-162155 A     9/2016

* cited by examiner

*Primary Examiner* — Qutbuddin Ghulamali
(74) *Attorney, Agent, or Firm* — Oliff PLC

(57) ABSTRACT

An information processing device associated with a prescribed vehicle receives an emergency message to inform occurrence of a prescribed event, and presents, upon reception of the emergency message, an electronic manual corresponding to the prescribed vehicle to a user.

19 Claims, 7 Drawing Sheets

FIG. 6

| TYPE OF EMERGENCY MESSAGE | INFORMATION TO BE PRESENTED | MANUAL PAGE NUMBER |
|---|---|---|
| EARTHQUAKE EARLY WARNING | HOW TO USE EXTERNAL ELECTRIC POWER FEEDING FUNCTION | P.32 |
| POWER FAILURE NOTIFICATION | HOW TO USE EXTERNAL ELECTRIC POWER FEEDING FUNCTION | P.32 |
| POWER SAVING REQUEST | HOW TO USE EXTERNAL ELECTRIC POWER FEEDING FUNCTION | P.32 |
| HEAVY RAIN WARNING | MEASURE AGAINST VEHICLE SUBMERGENCE | P.110 |
| EVACUATION ADVISORY DUE TO HEAVY RAIN | PRECAUTIONS WHEN EVACUATING BY VEHICLE | ... |
| NOTIFICATION OF TYPHOON APPROACH | PRE-CHARGE RECOMMENDATION | ... |
| ... | ... | ... |

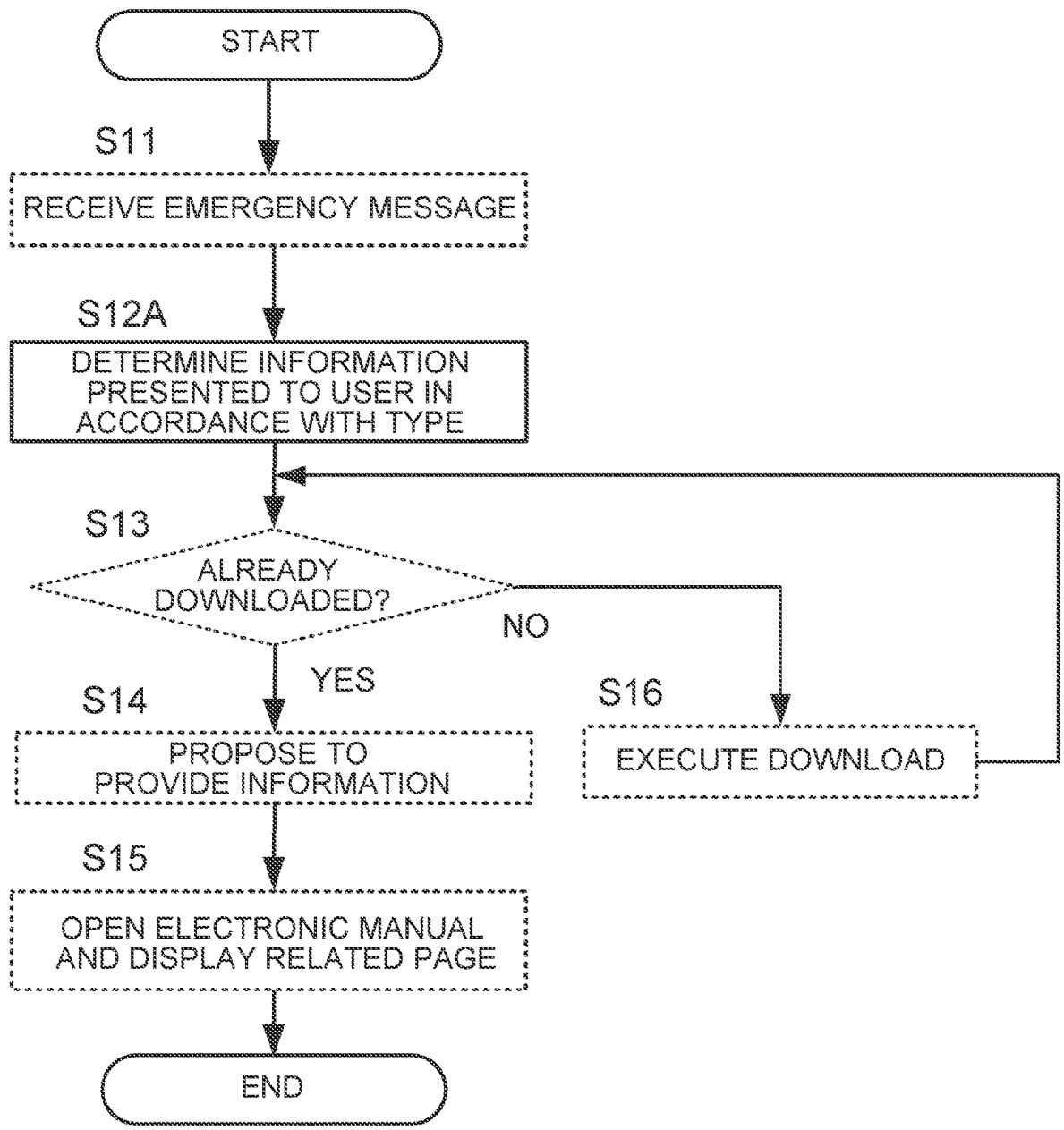

FIG. 8

| TYPE OF EMERGENCY MESSAGE | INFORMATION TO BE PRESENTED | MANUAL PAGE NUMBER |
|---|---|---|
| EARTHQUAKE EARLY WARNING | HOW TO USE EXTERNAL ELECTRIC POWER FEEDING FUNCTION | P.32 |
| | PRECAUTIONS WHEN EVACUATING BY VEHICLE | P.181 |
| | GUIDANCE FOR GAS STATIONS AVAILABLE IN EVENT OF POWER FAILURE | ... |
| ... | ... | ... |
| HEAVY RAIN NOTICE | MEASURE AGAINST VEHICLE SUBMERGENCE | P.110 |
| ... | ... | ... |

FIG. 9

RECEIVED EARTHQUAKE
EARLY WARNING

PLEASE PUT YOUR SAFETY FIRST

TO DISPLAY NECESSARY
INFORMATION, TAP LINK BELOW

HOW TO USE EXTERNAL ELECTRIC
POWER FEEDING FUNCTION

PRECAUTIONS WHEN
EVACUATING BY VEHICLE

GAS STATIONS AVAILABLE
IN EVENT OF POWER FAILURE

INFORMATION PROCESSING DEVICE, INFORMATION PROCESSING METHOD, AND PROGRAM

CROSS-REFERENCE TO RELATED APPLICATION

This application claims priority to Japanese Patent Application No. 2021-020141 filed on Feb. 10, 2021, incorporated herein by reference in its entirety.

BACKGROUND

1. Technical Field

The disclosure relates to a vehicle.

2. Description of Related Art

There is a movement to computerize the operating instructions for industrial products. In connection with the movement, for example, Japanese Unexamined Patent Application Publication No. 2016-162155 discloses an invention relating to an electronic manual system that can display a vehicle operation manual through mobile terminals.

SUMMARY

An object of the present disclosure is to enhance the convenience of electronic manuals.

A first aspect of the present disclosure relates to an information processing device associated with a prescribed vehicle. Specifically, the information processing device includes a control unit. The control unit is configured to execute: receiving an emergency message to inform occurrence of a prescribed event; and presenting, upon reception of the emergency message, an electronic manual corresponding to the prescribed vehicle to a user.

A second aspect of the present disclosure relates to an information processing method executed by an information processing device associated with a prescribed vehicle. Specifically, the information processing method includes: a step of receiving an emergency message to inform occurrence of a prescribed event; and a step of presenting, upon reception of the emergency message, an electronic manual corresponding to the prescribed vehicle to a user.

Other aspects may include a program for causing a computer to execute the information processing method, or a non-transitory computer readable storage medium storing the program.

The present disclosure can enhance the convenience of electronic manuals.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 shows an example of type data indicating association between types of emergency messages and information to be presented;

FIG. 7 is a flowchart of a process executed by the user terminal in a second embodiment;

FIG. 8 shows a modified example of the type data; and

FIG. 9 shows an example of information that is output to the user terminal in a third embodiment.

DETAILED DESCRIPTION OF EMBODIMENTS

Figure 1:
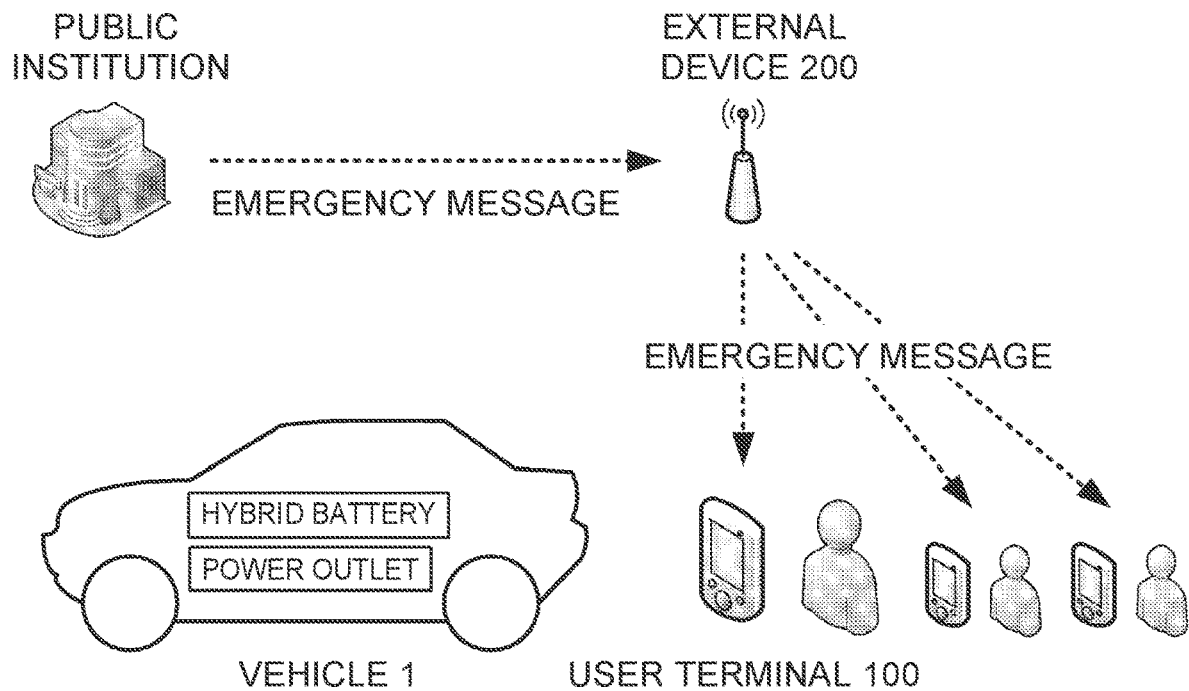
FIG. 1 shows a system configuration of a vehicle system according to an embodiment.

An aspect of the present disclosure relates to an information processing device (typically a mobile terminal possessed by a user) that is associated with a prescribed vehicle (typically a vehicle possessed by the user).

Specifically, the information processing device includes a control unit. The control unit executes: receiving an emergency message to inform occurrence of a prescribed event; and presenting, upon reception of the emergency message, an electronic manual corresponding to the prescribed vehicle to a user.

The emergency message is typically a message that is simultaneously transmitted by a public institution or the like that informs occurrence of a prescribed event. The prescribed event may be related to natural disasters, such as earthquake, tsunami, heavy rain, and typhoon, or may relate to life infrastructures such as power failure or water failure. Examples of the emergency message may include earthquake early warning, tsunami warning, and weather warning.

When an emergency message is transmitted, there is an occurrence of some type of emergency (or there is a possibly of the occurrence). Accordingly, it may become necessary to take some measures against the emergency in a vehicle.

For example, in the event of a power failure due to an earthquake, it may be considered to supply electric power stored in the vehicle to the outside (for example, a V2H system). However, when a user tries to use the function that is rarely used in everyday life, there may be a problem in that the user does not know how to use it.

In order to know how to use such a function, the user needs to refer to an operation manual of the vehicle. However, when the manual is an electronized one, the user first needs to download the electronic manual, which makes it difficult to obtain necessary information at once. Even when the user has the electronic manual in hand, it is not easy to find a necessary part from the very long manual.

In order to solve the problem, the information processing device according to one aspect of the present disclosure presents, upon reception of an emergency message from the outside, an electronic manual corresponding to a prescribed vehicle to the user. "Presenting the electronic manual" refers to providing a user with access to the electronic manual. For example, when the electronic manual is not stored in the information processing device, the information processing device may execute the process of downloading the electronic manual from the network. When the electronic manual is stored in the information processing device, the information processing device may execute the process of automatically opening the electronic manual, or the process of notifying the user that the electronic manual is available. This makes it possible to guide the user to the electronic manual.

When the control unit receives the emergency message and does not have an electronic manual corresponding to the prescribed vehicle, the control unit may be configured to download the electronic manual corresponding to the prescribed vehicle from a network.

For example, when the electronic manual is provided as a document file, the control unit may autonomously download the document file based on a network address indicating the location of the document file. When the electronic manual is provided as application software, the control unit may autonomously download and install the application software.

When the control unit receives the emergency message and has the electronic manual corresponding to the prescribed vehicle, the control unit may be configured to output the electronic manual corresponding to the prescribed vehicle.

The control unit may notify the user by push notification or the like that the electronic manual is available. When the electronic manual is provided within the application software, the control unit may autonomously start the application software.

The emergency message may correspond to any one of a plurality of predefined types of emergency messages. When the emergency message is received, the control unit may be configured to output, out of the information included in the electronic manual, the information in accordance with the type of the emergency message.

For example, a plurality of types of information may be predefined, such as "earthquake", "tsunami", "heavy rain", and "power failure", to provide appropriate information included in the electronic manual.

When the type of an emergency message is related to earthquake or power failure, the control unit may be configured to present information about electric power supply from the vehicle that is stated in the electronic manual.

The information regarding electric power supply from the vehicle may include at least information about a method of using a power outlet included in the vehicle for external electric power feeding.

In the event of earthquake or power failure, it may become necessary to supply electric power from the vehicle. Therefore, when an emergency message relating to the earthquake or power failure is received, the method of supplying electric power from the vehicle may be guided.

The information processing device may further include a storage unit configured to store the types of emergency messages in association with types of information presented to the user.

The information processing device may further include a storage unit configured to store the types of emergency messages in association with page numbers of the electronic manual presented to the user.

Such configuration makes it possible to provide the user with appropriate information in accordance with each type of the emergency message.

Hereinafter, embodiments of the present disclosure will be described with reference to the drawings. The configurations of the following embodiments are merely illustrative, and therefore the present disclosure is not limited to the configurations of the embodiments.

First Embodiment

An outline of a vehicle system according to a first embodiment will be described with reference to FIG. 1. The vehicle system according to the present embodiment includes a vehicle 1, a user terminal 100 possessed by a user of the vehicle 1, and an external device 200 that transmits emergency messages to the user terminal 100.

The vehicle 1 is a hybrid vehicle with a function to supply electric power source to the outside of the vehicle. The vehicle 1 has a hybrid battery and a power outlet. The power outlet is an interface to supply electric power stored in the hybrid battery to the outside.

The user terminal 100 is a mobile terminal possessed by the user of the vehicle 1. The user terminal 100 has a function to receive an emergency message transmitted by a public institution and a function to provide, upon reception of the emergency message, an electronic manual of the vehicle 1 to the user, depending on the content of the message. This allows the user of the vehicle 1 to obtain necessary information about the vehicle 1 in emergency.

The external device 200 is a device that transmits an emergency message provided by the public institution. The external device 200 may be included in a mobile communication network. The external device 200 receives an emergency message transmitted by the national and local governments, and simultaneously transmits the emergency message to the terminal devices located within a prescribed area. The prescribed area may be defined according to, for example, administrative divisions, or may be defined according to other divisions. The emergency message is typically information about disasters. Examples of the emergency message may include a notification of the occurrence of an earthquake (earthquake early warning), a notice of the risk of disaster (evacuation preparation information, evacuation instruction information), and information related to the safety of the public. The emergency message may also be a message to request consumers to save electric power in the case where electric power supply and electric power demand are out of balance (or expected to be out of balance).

The emergency message can be transmitted using existing services such as Earthquake and Tsunami Warning System (ETWS), and Cell Broadcast Service (CBS).

Component members of the system will be described in detail.

Figure 2:
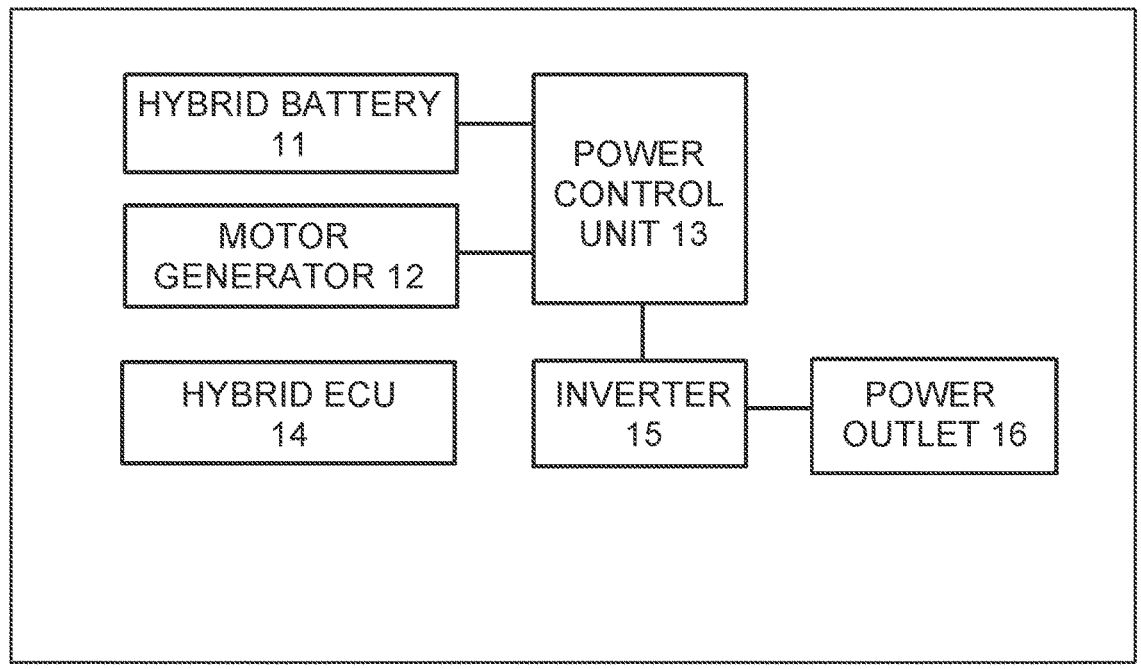
FIG. 2 is a block diagram showing component members included in a vehicle.

FIG. 2 is a block diagram schematically showing one example of the configuration of the vehicle 1 shown in FIG. 1. The vehicle 1 includes a hybrid battery 11, a motor generator 12, a power control unit 13, a hybrid ECU 14, an inverter 15, and a power outlet 16.

In this example, as an electronic control unit (ECU) mounted on the vehicle 1, an ECU (hybrid ECU) that controls charging and discharging is illustrated. However, the vehicle 1 may be mounted with other ECUs, such as an engine ECU and a body ECU, which control an operation other than the charging.

The hybrid battery 11 is a battery that provides electric power used to drive the vehicle 1. The hybrid battery 11 supplies electric power to the motor generator 12 and is also charged with the electric power generated by the motor generator 12. As the hybrid battery 11, a secondary battery such as a nickel-hydrogen battery or a lithium-ion battery may be used.

The motor generator 12 is an electric motor generator that functions as an electric motor or a generator. The motor generator 12, which is connected to a drive shaft via a power split device, can convert electric power into kinetic energy or convert kinetic energy into electric power.

The power control unit 13 performs conversion of electric power for driving. Specifically, the power control unit 13 includes an inverter that converts electric power from direct current to alternating current, and a converter that controls voltage.

The hybrid ECU 14 is an electronic control unit that controls travel using electric power. The hybrid ECU 14 controls driving of the drive shaft driven by the electric power stored in the hybrid battery 11, collection of the electric power generated by regenerative braking, and the like. The hybrid ECU 14 also controls supply of electric power stored in the hybrid battery 11 to the outside as necessary.

When the vehicle 1 is a plug-in hybrid vehicle, the hybrid ECU 14 can also control charging of the hybrid battery 11 with an external power source.

The inverter 15 converts the electric power stored in the hybrid battery 11 from direct current to alternating current to provide the electric power to the outside.

The power outlet 16 is a unit to provide electric power to the outside of the vehicle. When a plug is inserted into the power outlet 16, the electric power can be supplied to the outside of the vehicle. When the vehicle 1 is a plug-in hybrid vehicle, the power outlet 16 may also function as a charging port (power inlet) of the vehicle 1.

When the user performs a prescribed operation, the vehicle 1 can be switched to a mode for supplying electric power to the outside of the vehicle. The hybrid ECU 14 performs the control. However, when the user who is not familiar with the operation attempts to switch modes, the user needs to refer to the operation manual of the vehicle to find out how to operate. The external electric power feeding function performed by the vehicle, in particular, is often necessary in the event of earthquake or other disasters. Therefore, in the present embodiment, when the user terminal 100 receives an emergency message about an earthquake, the user terminal 100 executes a process of providing the user with information about the external electric power feeding that is described in the electronic manual of the vehicle 1.

Description is now given of the user terminal 100.

Figure 3:
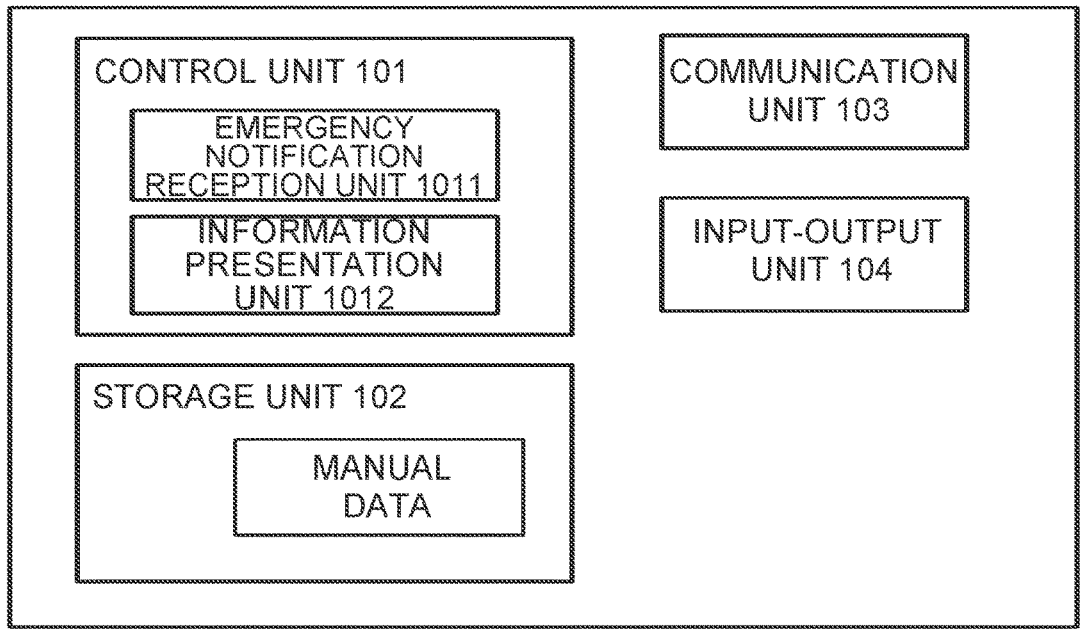
FIG. 3 is a block diagram showing component members included in a user terminal.

FIG. 3 is a block diagram schematically showing one example of the configuration of the user terminal 100 shown in FIG. 1.

The user terminal 100 may be configured with a general-purpose computer. Specifically, the user terminal 100 may be configured as a computer including a processor such as a CPU and a GPU, a primary storage such a RAM and a ROM, and an auxiliary storage such as an EPROM, a hard disk drive, and a removable medium. The auxiliary storage stores an operating system (OS), various programs, various tables, and the like. When the programs stored in the auxiliary storage unit are executed, the functions matched with prescribed purposes, which will described later, can be implemented. However, some or all of the functions may be implemented by a hardware circuit such as an ASIC or an FPGA.

The user terminal 100 is a portable computer possessed by the user of the vehicle 1. The user terminal 100 includes a control unit 101, a storage unit 102, a communication unit 103, and an input-output unit 104.

The control unit 101 is means for controlling the user terminal 100. For example, the control unit 101 is configured with an information processing unit, such as a central processing unit (CPU) and a graphics processing unit (GPU).

The control unit 101 has an emergency notification reception unit 1011 and an information presentation unit 1012 as functional modules. The function modules may each be implemented by the CPU executing programs that are stored in storage means such as a ROM.

The emergency notification reception unit 1011 receives an emergency message via the mobile communication network. The emergency message is a message that is simultaneously transmitted by the national or local governments to mobile communication terminals that are located in a prescribed area. The emergency message is also referred to as an early warning email or an area email for providing earthquake early warning, tsunami warning, and information about other disasters to the public. The emergency message may be used to inform the public of other information. The emergency notification reception unit 1011 waits for an emergency message while the information processing device is in operation. Upon reception of the emergency message, the emergency notification reception unit 1011 notifies the user via the input-output unit 104 described later, and transmits the emergency message to the information presentation unit 1012 described later.

The information presentation unit 1012 provides information to the user of the vehicle 1 in accordance with the content of the emergency message received by the emergency notification reception unit 1011.

The information presentation unit 1012 has a function to manage the electronic manual of the vehicle 1. When the received emergency message is related to the occurrence of an earthquake, the information presentation unit 1012 accesses the electronic manual of the vehicle 1, and provides the user with information about how to use the external electric power feeding function included in the vehicle 1.

The storage unit 102, which is means for storing information, is configured with a storage medium, such as a RAM, a magnetic disk, or a flash memory. The storage unit 102 stores various programs executed by the control unit 101, data used by the programs, and the like. The storage unit 102 also stores the electronic manual (manual data) of the vehicle 1 downloaded from the network.

The communication unit 103 is an interface for connecting the user terminal 100 to the mobile communication network. For example, the communication unit 103 can communicate with a wide area network (for example, the Internet) by using a mobile communication network, a wireless LAN, and Bluetooth (registered trademark).

The input-output unit 104 is means for accepting input operation performed by the user and presenting information to the user. Specifically, the input-output unit 104 is constituted of a touchscreen panel and control means therefor, and a liquid crystal display and control means therefor. The touchscreen panel and the liquid crystal display are formed into a single touchscreen panel display in the present embodiment.

The input-output unit 104 may have a speaker or the like to output voice sound. For example, when the emergency notification reception unit 1011 receives an emergency message, the input-output unit 104 outputs voice sound, and also displays the content on the liquid crystal display.

Figure 4:
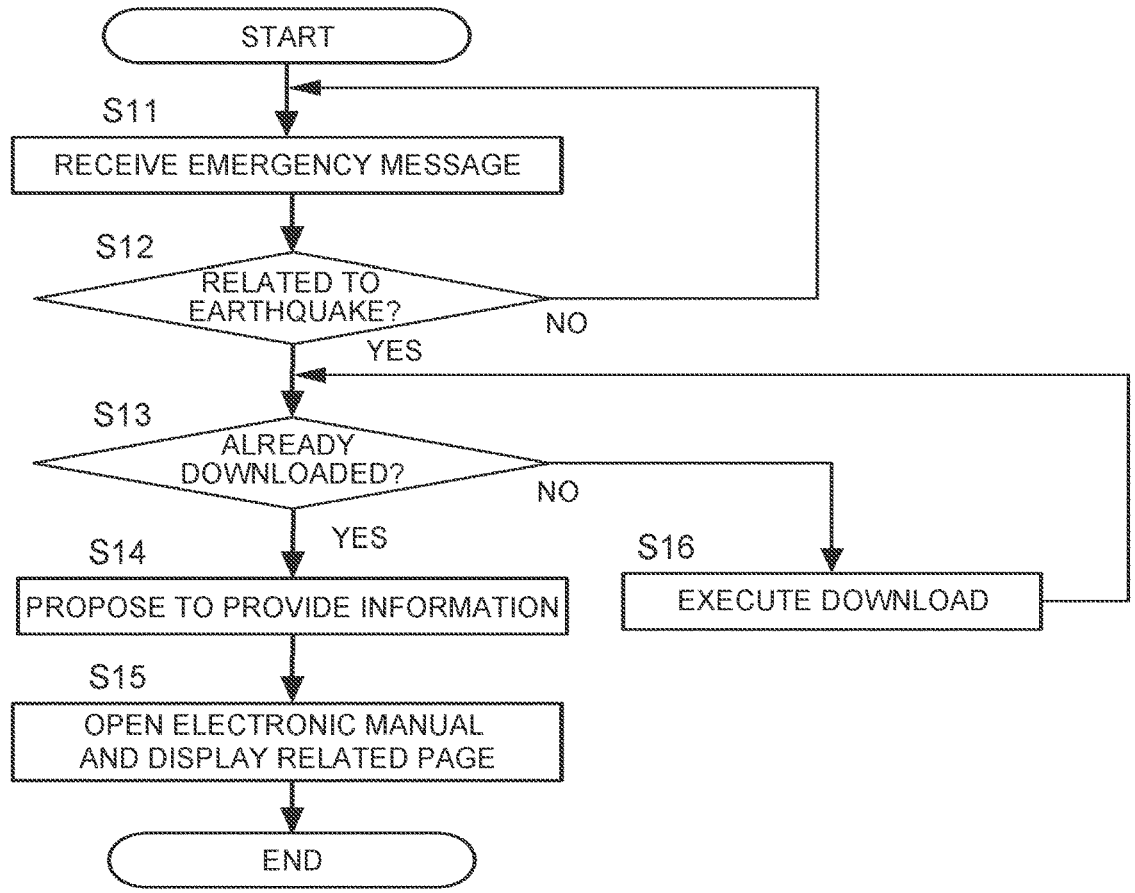
FIG. 4 is a flowchart of a process executed by the user terminal in a first embodiment.

Description is now given of the process to be executed when the user terminal 100 (emergency notification reception unit 1011) receives an emergency message. FIG. 4 is a flowchart of the process executed by the user terminal 100 (control unit 101). The process is started when an emergency message is received.

First, in step S11, the emergency notification reception unit 1011 receives an emergency message. The received emergency message is transmitted to the information presentation unit 1012.

Next, in step S12, the information presentation unit 1012 determines whether or not the received emergency message is related to the occurrence of an earthquake. There may be a plurality of types of emergency messages. In the present embodiment, however, whether or not the message is related to the occurrence of an earthquake is determined. For example, when header information of the emergency message includes data indicating the type of information, it is possible to determine whether the emergency message is related to the occurrence of an earthquake by referring to the data.

When YES is determined in step S12, the process shifts to step S13. When NO is determined in step S12, the process returns to an initial state.

In step S13, the information presentation unit 1012 determines whether or not a preset electronic manual of the vehicle is already downloaded. Here, when the electronic manual is not yet downloaded, the process shifts to step S16 to acquire the electronic manual allocated on the network based on the information previously stored. For example, when the electronic manual is provided as a document file, the information presentation unit 1012 downloads the document file. When the electronic manual is provided as application software, the information presentation unit 1012 downloads and installs the application software.

When user operation (for example, an operation to install the application software) is necessary, a guidance to prompt the user operation may be output.

It is desirable to associate the user terminal 100 with the vehicle 1 in advance. For example, an identifier of the vehicle 1 used by the user, an identifier of the corresponding electronic manual, a download destination of the electronic manual, and so on, may be stored in the storage unit 102 in advance. By referring to these pieces of information, the information presentation unit 1012 can download the electronic manual.

When the electronic manual is already downloaded in step S13, the process shifts to step S14, where the information presentation unit 1012 informs the user that information (guidance regarding how to use the external electric power feeding function in the present embodiment) is available.

Figure 5C:
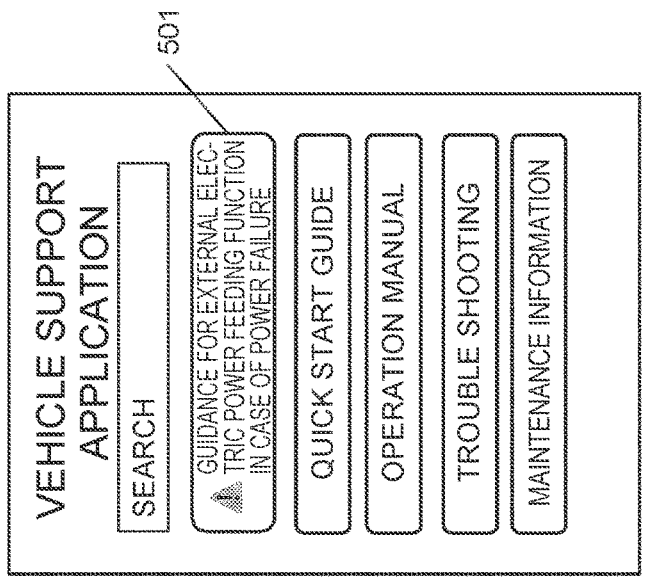
FIGS. 5A to 5C show examples of information that are output to the user terminal in the first embodiment.
Figure 5B:
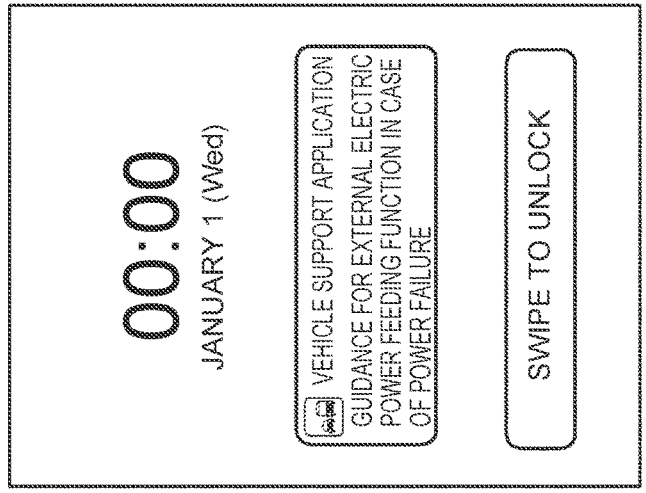
Figure 5A:
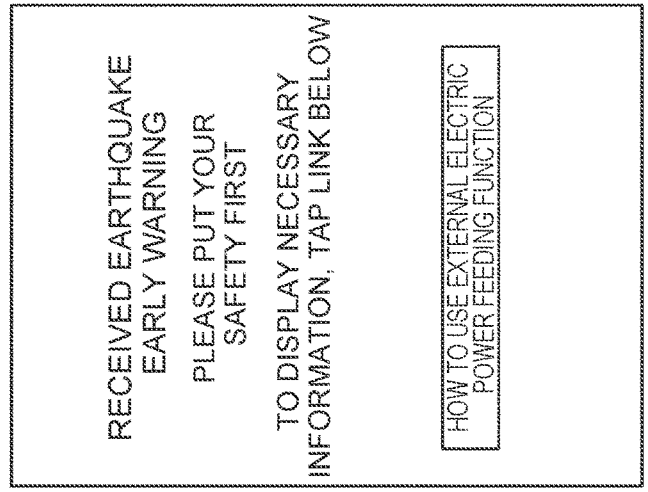

The notification that the information is available may be made by push notification. For example, a screen as shown in FIG. 5A or 5B is output to acquire a user's response. In this case, when the user operates to express a desire to get the information, the information presentation unit 1012 starts the electronic manual.

For example, when the electronic manual is provided as application software (for example, support software provided by the vehicle manufacturer), the information presentation unit 1012 starts the application software. When the electronic manual is provided as a document file, the information presentation unit 1012 starts a reader associated with the document file to read the document file.

The notification that the information is available may be made by other notification than the push notification. For example, when the electronic manual is provided as application software, the information presentation unit 1012 may generate a notification in the software. For example, a message stating that the information is available is output on a menu screen of the software. FIG. 5C is an example where a link to information (reference sign 501) is output on the menu screen of the application software. Such configuration makes it possible to provide appropriate information to the user who has started the software to seek for the information.

It is also possible to skip the process of step S14. In other words, the electronic manual may automatically be opened, regardless of the user's intention. Moreover, the user terminal 100 may be recovered from a sleep state.

In step S15, the information presentation unit 1012 outputs the downloaded electronic manual. For example, when the electronic manual is provided as application software, the information presentation unit 1012 starts the application software. When the electronic manual is provided as a document file, the information presentation unit 1012 starts the reader associated with the document file to read the document file. Then, the information presentation unit 1012 displays a prescribed page in the electronic manual, i.e., the page describing the method of external electric power feeding by the vehicle.

By continuously performing these operations, the user terminal 100 can present a necessary section of the electronic manual to the user.

As described in the foregoing, upon reception of an emergency message from the external device 200, the user terminal 100 in the present embodiment determines the type of the emergency message. When the content of the emergency message is related to an earthquake, the user terminal 100 executes the process to guide the method of external electric power feeding by the vehicle. This allows the user to obtain necessary information about the vehicle that the user possesses, without voluntarily performing operation.

In the first embodiment, when the user terminal 100 does not have a stored electronic manual of the vehicle, the user terminal 100 automatically downloads the manual. However, instead of downloading the manual, the user terminal 100 may output a message to prompt the user to download the manual. For example, the user terminal 100 may output the URL or the like of a website that distributes the electronic manual, and when the user approves download, the user terminal 100 may hand over the process to a browser.

Second Embodiment

In the first embodiment, in the process in step S12, the information presentation unit 1012 determines whether or not the emergency message is related to an earthquake, and when the emergency message is related to an earthquake, the information presentation unit 1012 executes the process to guide the method of external electric power feeding by the vehicle.

In contrast, in a second embodiment, different information is output in accordance with the types of a received emergency message.

For example, when the emergency message is related to flood disaster or tsunami, it is desirable to provide the user with information about vehicle submergence or evacuation using the vehicle. When the emergency message is a notice of typhoon approach, it may also be possible to advice full charging of the plug-in hybrid vehicle in case of power failure. When the emergency message notifies a tight electric power supply (that is, the risk of power failure), it is desirable to inform the user how to supply electric power from the vehicle to buildings in order to save electric power.

In the second embodiment, the user terminal 100 (storage unit 102) stores data (hereafter type data) that associates the types of emergency messages with the information presented to the user. FIG. 6 is an example of the type data stored in the storage unit 102. In the illustrated example, the page number of the manual is defined as the information to be presented. The type data is referenced and utilized by the information presentation unit 1012. Although, in FIG. 6, the type of emergency message and the information to be presented are described in text, they can be defined by identifiers.

FIG. 7 is a flowchart of a process executed by the user terminal 100 in the second embodiment. The same steps as those in the first embodiment are shown by dotted lines and description thereof is omitted.

When the emergency notification reception unit 1011 receives an emergency message, the information presentation unit 1012 acquires the type of the emergency message in step S12A. The type may be acquired by referring to the message header, for example, or by analyzing the message body. For example, keywords such as "earthquake", "power", and "flood" may be detected in the message body. Based on the type data stored in advance, the information presentation unit 1012 identifies the information to be presented to the user. For example, in the example of FIG. 6, when the emergency message is a heavy rain notice, the information presentation unit 1012 determines the page (page 110) describing the measures against vehicle submergence as the information to be presented.

The steps subsequent to S13 are the same as in the first embodiment.

As described in the foregoing, in the second embodiment, a plurality of pieces of different information are presented to the user based on the type of the emergency message. Such configuration allows more flexibility in providing information.

Third Embodiment

In the first and second embodiments, only one type of information is presented for one emergency message. However, other information may be selectively presented.

For example, when the type of the emergency message is related to an earthquake, a plurality of pieces of information may be presented. Examples of the pieces of information may include "how to evacuate in occurrence of earthquake", "guide for gas stations available in event of power failure", and "other vehicle functions available in case of emergency".

FIG. 8 is an example of type data in a third embodiment. In the third embodiment, a plurality of pieces of information are defined for each type of emergency message. When a plurality of pieces of information are defined in the type data, the information presentation unit 1012 notifies the user that the pieces of information can be output, and makes the user select from these pieces of information. FIG. 9 is an example of a screen that allows the user to select the pieces of information. In this example, the information selected by the user is output via the input-output unit 104. Once the user selects the information, the information presentation unit 1012 presents the selected information to the user. For example, in the example of FIG. 8, when the user selects "Precautions when evacuating by vehicle", a page 181 of the electronic manual is output.

Modifications

The embodiments disclosed are merely examples, and the disclosure can suitably be changed without departing from the scope thereof.

For example, the processes or means described in the present disclosure can freely be combined and implemented without departing from the range of technical consistency.

In the description of the embodiments, the information to be presented to the user is the electronic manual that can be downloaded to a local storage. However, an information source may be completed online. For example, the user terminal 100 may access data on the web (online manual) and output the necessary information.

In the description of the embodiments, a user possesses a single vehicle. However, when the user has two or more vehicles, the electronic manual for each vehicle may be selectively provided to the user.

The processes described to be performed by one device may be executed by a plurality of devices in cooperation with each other. Alternatively, the processes described to be executed by different devices may be executed by one device. In a computer system, hardware configuration (server configuration) that implements functions may flexibly be changed.

The present disclosure can also be implemented when a computer program, mounted with the functions described in the embodiment, is supplied to a computer, and one or more processors included in the computer read and execute the program. Such a computer program may be provided to the computer by a non-transitory computer readable storage medium that is connectable to a system bus of the computer, or may be provided to the computer through a network. Examples of the non-transitory computer readable storage medium may include a disk or a disc of any types, including magnetic disks (such as floppy (registered trademark) disks, hard disk drives (HDDs)) and optical discs (such as CD-ROMs, DVD discs, and Blu-ray discs), and a medium of any types suitable for storing electronic commands, including read-only memories (ROMs), random-access memories (RAMs), EPROMs, EEPROMs, magnetic cards, flash memories, and optical cards.

What is claimed is:

1. An information processing device associated with a prescribed vehicle, comprising:
   a control unit having a processor configured to:
      receive an emergency message to inform occurrence of a prescribed event; and
      present, on a display, at least a portion of an electronic manual corresponding to the prescribed vehicle to a user in response to receiving the emergency message; and
   a storage unit that stores a plurality of predefined types of emergency messages in association with one or more pieces of information in the electronic manual, the plurality of predefined types of emergency messages including at least one of earthquakes, tsunamis, heavy rain, typhoon, power failure and water failure,
   wherein the processor is further configured to:
      acquire one or more types of the plurality of predefined types from the received emergency message; and
      present, on the display, one or more pieces of information in the electronic manual that are associated with the acquired one or more types.

2. The information processing device according to claim 1, wherein when the control unit receives the emergency message and does not have an electronic manual corresponding to the prescribed vehicle, the control unit is configured to download the electronic manual corresponding to the prescribed vehicle from a network.

3. The information processing device according to claim 1, wherein when the control unit receives the emergency message and has an electronic manual corresponding to the prescribed vehicle, the control unit is configured to output the electronic manual corresponding to the prescribed vehicle.

4. The information processing device according to claim 1, wherein the emergency message includes at least a notification relating to power failure.

5. The information processing device according to claim 4, wherein when the type of an emergency message is related to an earthquake or power failure, the control unit is configured to present information about electric power supply from the vehicle that is stated in the electronic manual.

6. The information processing device according to claim 5, wherein the information about the electric power supply from the vehicle includes at least information about a method of using a power outlet included in the vehicle for external electric power feeding.

7. The information processing device according to claim 1, wherein the emergency message includes at least a notification relating to an earthquake.

8. The information processing device according to claim 1, wherein the storage unit is configured to store the types of emergency messages in association with types of information presented to the user.

9. The information processing device according to claim 1, wherein the storage unit is configured to store the types of emergency messages in association with page numbers of the electronic manual presented to the user.

10. The information processing device according to claim 1, wherein the plurality of predefined types of emergency messages include each of earthquakes, tsunamis, heavy rain, typhoon, power failure and water failure.

11. An information processing method executed by an information processing device associated with a prescribed vehicle, the information processing method comprising:
 a step of receiving an emergency message to inform occurrence of a prescribed event; and
 a step of presenting, on a display, at least a portion of an electronic manual corresponding to the prescribed vehicle to a user in response to the received emergency message;
 a step of acquiring one or more types of the plurality of predefined types from the received emergency message, the plurality of predefined types being stored in a storage unit in association with one or more pieces of information in the electronic manual, the plurality of predefined types of emergency messages including at least one of earthquakes, tsunamis, heavy rain, typhoon, power failure and water failure; and
 a step of presenting, on the display, one or more pieces of information in the electronic manual that are associated with the acquired one or more types.

12. The information processing method according to claim 11, wherein when the emergency message is received and the electronic manual corresponding to the prescribed vehicle is not present, the electronic manual corresponding to the prescribed vehicle is downloaded from a network.

13. The information processing method according to claim 11, wherein when the emergency message is received and the electronic manual corresponding to the prescribed vehicle is present, the electronic manual corresponding to the prescribed vehicle is output.

14. The information processing method according to claim 11, wherein the emergency message includes at least a notification relating to power failure.

15. The information processing method according to claim 14, wherein when the type of an emergency message is related to an earthquake or power failure, information about electric power supply from the vehicle that is stated in the electronic manual is presented.

16. The information processing method according to claim 15, wherein the information about the electric power supply from the vehicle includes at least information about a method of using a power outlet included in the vehicle for external electric power feeding.

17. The information processing method according to claim 11, wherein the emergency message includes at least a notification relating to an earthquake.

18. The information processing method according to claim 11, further comprising a step of acquiring information associating the types of emergency messages with types of information presented to the user.

19. A non-transitory, computer readable medium storing instructions for causing a computer to execute the information processing method according to claim 11.

* * * * *